United States Patent
Esteghlal et al.

(10) Patent No.: US 6,439,189 B1
(45) Date of Patent: Aug. 27, 2002

(54) METHOD FOR OPERATING AN INTERNAL COMBUSTION ENGINE, ESPECIALLY AN INTERNAL COMBUSTION ENGINE IN A MOTOR VEHICLE

(75) Inventors: Gholamabas Esteghlal, Ludwigsburg; Georg Mallebrein, Korntal-Münchingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,476
(22) PCT Filed: Jun. 23, 1999
(86) PCT No.: PCT/DE99/01822
§ 371 (c)(1),
(2), (4) Date: Feb. 28, 2000
(87) PCT Pub. No.: WO00/00727
PCT Pub. Date: Jan. 6, 2000

(30) Foreign Application Priority Data

Jun. 27, 1998 (DE) .......................................... 198 28 774

(51) Int. Cl.$^7$ ................................................ F02M 33/02
(52) U.S. Cl. .................... 123/295; 123/516; 123/520
(58) Field of Search ................................ 123/299, 295, 123/305, 516, 518, 519, 520, 521

(56) References Cited

U.S. PATENT DOCUMENTS

| | | | | |
|---|---|---|---|---|
| 5,245,975 A | * | 9/1993 | Ito | 123/520 |
| 5,706,789 A | | 1/1998 | Yamada et al. | |
| 5,826,565 A | * | 10/1998 | Mueller et al. | 123/520 |
| 5,950,603 A | * | 9/1999 | Cook et al. | 123/520 |
| 6,116,221 A | * | 9/2000 | Matsumoto et al. | 123/520 |

FOREIGN PATENT DOCUMENTS

| | | |
|---|---|---|
| EP | 0 488 254 | 6/1992 |
| JP | 10 331728 | 12/1998 |

\* cited by examiner

Primary Examiner—Erick Solis
(74) Attorney, Agent, or Firm—Walter Ottesen

(57) ABSTRACT

An internal combustion engine (1), especially for a motor vehicle, is described which is provided with an injection valve (13) with which the fuel, which is to be injected for a combustion, can be injected directly into a combustion chamber (4) during an intake phase and during a compression phase. A control apparatus is provided for open-loop control and/or closed-loop control of the fuel mass injected into the combustion chamber (4). A regeneration gas can be supplied by the control apparatus to the combustion chamber (4) during the intake phase.

2 Claims, 2 Drawing Sheets

METHOD FOR OPERATING AN INTERNAL COMBUSTION ENGINE, ESPECIALLY AN INTERNAL COMBUSTION ENGINE IN A MOTOR VEHICLE

FIELD OF THE INVENTION

The invention relates to a method for operating an internal combustion engine especially of a motor vehicle wherein the fuel, which is to be injected for a combustion, is directly injected into a combustion chamber during an intake phase and during a compression phase. Furthermore, the invention relates to an internal combustion engine especially for a motor vehicle having an injection valve with which the fuel, which is to be injected for a combustion, can be injected directly into a combustion chamber during an intake phase and during a compression phase. The engine also includes a control apparatus for the open-loop control and/or closed-loop control of the fuel mass injected into the combustion chamber.

BACKGROUND OF THE INVENTION

Systems for the direct injection of fuel into the combustion chamber of an internal combustion engine are generally known. In these systems, one differentiates a so-called stratified operation and a so-called homogeneous operation. The stratified operation is especially used for lower loads; whereas, the homogeneous operation is used for larger loads applied to the internal combustion engine.

In the stratified operation, the fuel is injected into the combustion chamber during the compression phase of the engine so that a fuel cloud is located in the immediate vicinity of a spark plug at the time point of the ignition. This injection can take place in different ways. Thus, it is possible that the injected fuel cloud is located at the spark plug already during the injection or directly after the injection and is ignited thereby. Likewise, it is possible that the injected fuel cloud is guided to the spark plug by a charge movement and is only then ignited. In both combustion processes, no uniform fuel distribution is present. Instead, there is a stratified charge.

The advantage of the stratified operation is that the applied lower loads can be handled by the engine with only a very small quantity of fuel. Larger loads can, however, not be satisfied by the stratified operation.

The fuel is injected during the intake phase of the engine in homogeneous operation provided for such larger loads so that a swirling and therefore a distribution of the fuel can still easily take place in the combustion chamber. To this extent, the homogeneous operation approximately corresponds to the operation of engines wherein fuel is injected into the intake manifold in the conventional manner. The homogeneous operation can be utilized, as required, also for lesser loads.

In the stratified operation, the throttle flap is opened wide in the intake manifold leading to the combustion chamber and the combustion is open-loop controlled and/or closed-loop controlled essentially only by the fuel mass to be injected. In the homogeneous operation, the throttle flap is opened or closed in dependence upon the requested torque and the fuel mass, which is to be injected, is open-loop controlled and/or closed-loop controlled in dependence upon the inducted air mass.

In both modes of operation, that is, in the stratified operation and in the homogeneous operation, the fuel mass, which is to be injected, is open-loop controlled and/or closed-loop controlled additionally in dependence upon a plurality of additional input quantities to an optimal value with respect to fuel saving, exhaust-gas reduction and the like. The open-loop control and/or closed-loop control is then different in the two modes of operation.

It is possible to combine the two described modes of operation with each other. This is known as a so-called double injection. For this purpose, the fuel mass is determined which in total, is to be injected. Then, a first part of the fuel mass to be injected is injected during the intake phase and the remaining second part of the fuel mass to be injected is injected into the combustion chamber directly thereafter during the compression phase. The fuel mass, which is to be injected, for one and the same combustion is therefore injected into the combustion chamber of the engine with the aid of two injections.

The advantage of a double injection of this kind is that an abrupt switchover between the two modes of operation is avoided, that is, a switchover between the homogeneous operation and the stratified operation and back. In lieu thereof, the switchover is "blurred" over a wide range in that, for example, the fuel mass, which is to be injected during the intake phase, is slowly reduced and the fuel mass which is to be injected during the compression phase, is slowly increased.

Likewise, it is possible to provide a tank venting for the engine. Here, the so-called regeneration gas, which is vaporized in a fuel tank, is collected and supplied to the combustion. The advantage of a tank venting of this kind is that the fuel, which is contained in the regeneration gas, does not escape to the ambient but is used by the engine.

SUMMARY OF THE INVENTION

The object of the invention is to provide a method for operating an internal combustion engine as well as to provide an internal combustion engine wherein the advantages of the double injection and the tank venting are present.

This object is achieved in accordance with the invention in a method of the kind referred to above in that a regeneration gas is supplied to the combustion chamber during the intake phase. The object according to the invention is achieved in an internal combustion engine of the kind initially mentioned above in that a regeneration gas can be supplied to the combustion chamber during the intake phase by the control apparatus.

By supplying the regeneration gas during the intake phase, the breakdown of the entire quantity of fuel to be injected to the intake phase and the compression phase is not affected or even disturbed. The accuracy especially of the fuel mass, which is to be injected during the compression phase, is therefore maintained undiminished. The advantage is achieved notwithstanding that the regeneration gas is supplied to the combustion chamber and therefore to the combustion. The invention therefore combines the advantages of the direct injection (especially of the reduced fuel consumption and the lower discharge of toxic substances of the stratified operation) with the advantages of the tank venting, especially the complete utilization also of vaporizing fuel.

It is especially advantageous when fuel is injected and regeneration gas is supplied to the combustion chamber during the intake phase and when fuel is injected into the combustion chamber during the compression phase but no regeneration gas is supplied.

In an advantageous embodiment of the invention, the fuel mass, which is supplied in total into the combustion chamber during a single combustion, is composed of a first part and a second part. The first part is supplied during the intake phase and the second part is injected during the compression phase. The first part is put together from a third injected part and from a fourth part comprising the regeneration gas.

In an advantageous embodiment of the invention, for the first part of the total mass of supplied fuel, the third injected part is reduced and the fourth part made up of the regeneration gas is increased.

In this way, it is achieved that as much vaporized fuel as possible is supplied to the combustion chamber of the engine. The use of the vaporized fuel is thereby optimized.

It is especially advantageous when so much regeneration gas is supplied to the combustion chamber that the third injected part reaches a minimum value or zero.

The realization of the method of the invention in the form of a control element is especially significant with this control element being provided for a control apparatus of an internal combustion engine, especially of a motor vehicle. A program is stored on the control element which is capable of being run in a computer apparatus and especially in a microprocessor and is suitable for carrying out the method of the invention. In this case, the invention is realized by a program stored on the control element so that this control element, which is provided with the program, can define the invention in the same manner as the method for whose execution the program is suitable. As a control element, especially an electrical storage medium can be applied, for example, a read-only-memory.

Additional features, application possibilities and advantages of the invention become apparent from the following description of the embodiments of the invention which are shown in the figures of the drawing. Here, all described or illustrated features constitute the subject matter of the invention by themselves or in any desired combination independently of their combination in the patent claims or their dependency as well as independent of their formulations or illustration in the description or in the drawing.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
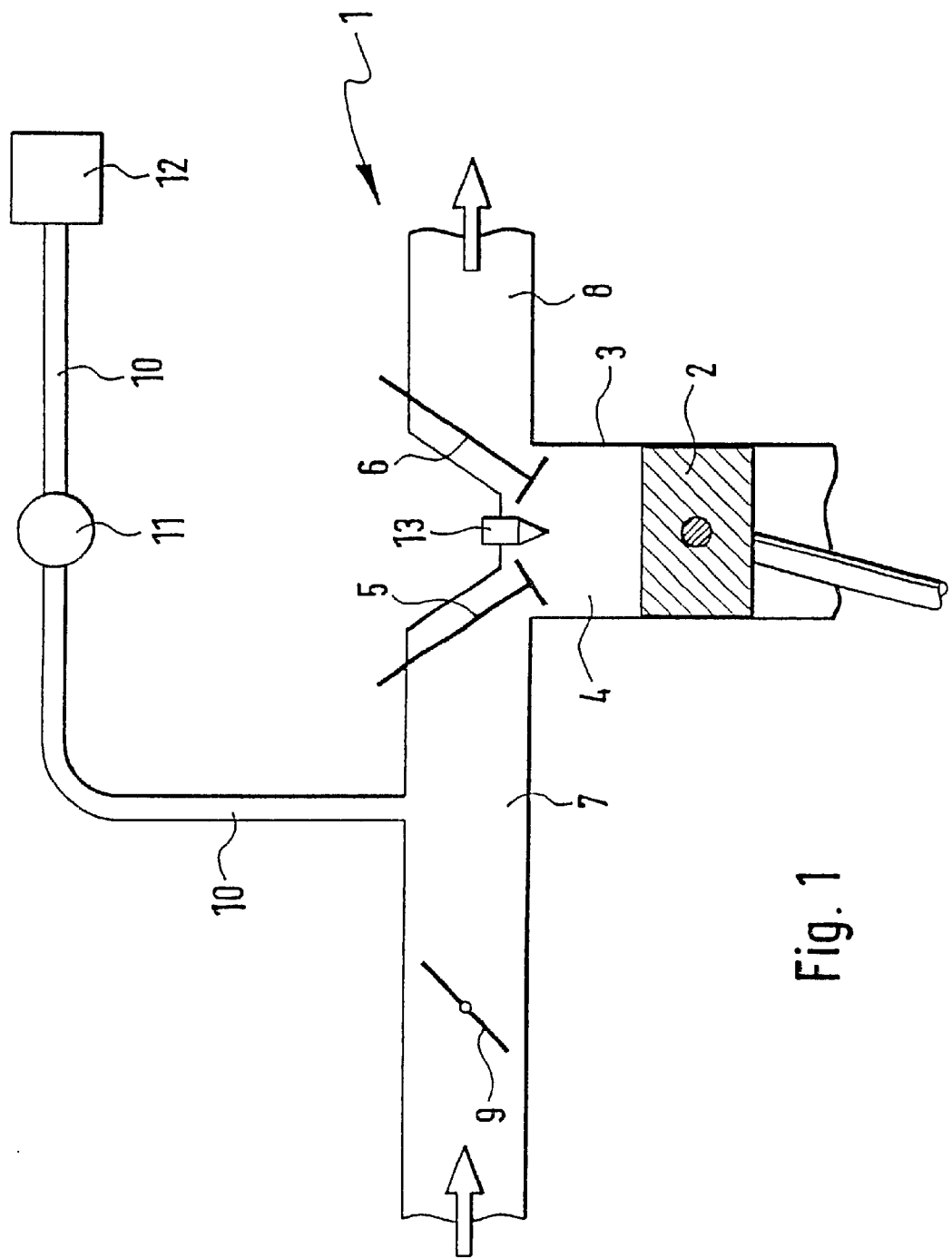
FIG. 1 shows a schematic representation of an embodiment of an internal combustion engine according to the invention; and, FIG. 2 shows a schematic representation of an embodiment of a breakdown of the injected fuel mass in accordance with the method of the invention.

In FIG. 1, an internal combustion engine 1 of a motor vehicle is shown, wherein a piston 2 is movable back and forth in a cylinder 3. The cylinder 3 is provided with a combustion chamber 4, which, inter alia, is delimited by the piston 2, an inlet valve 5 and an outlet valve 6. An intake manifold 7 is coupled to the inlet valve 5 and an exhaust-gas pipe 8 is coupled to the outlet valve 6. Likewise, an injection valve and, if needed, a spark plug are assigned to the combustion chamber 4.

A rotatable throttle flap 9 is accommodated in the intake manifold 7. Air can be supplied via the throttle flap 9 to the intake manifold 7. The quantity of the supplied air is dependent upon the angular position of the throttle flap 9.

A tank-venting line 10 opens into the intake manifold 7 between the throttle flap 9 and the combustion chamber 4.

The tank-venting line 10 is connected via a tank-venting valve 11 to an active charcoal filter 12. Regeneration gas, which vaporizes in a fuel tank of the motor vehicle and which is collected in the charcoal filter 12, can be supplied to the intake manifold 7 via the tank-venting line 10. The quantity of the supplied regeneration gas is dependent upon the position of the tank-venting valve 11.

An injection valve 13 is allocated to the cylinder 3 and fuel can be injected into the combustion chamber 4 of the engine 1 via the injection valve 13. Likewise, a spark plug is threadably engaged in the cylinder 3 with which the injected fuel can be ignited.

The throttle flap 9 is opened wide in a so-called stratified operation of the engine 1. The fuel is injected into the combustion chamber 4 by the injection valve 13 during a compression phase caused by the piston 2. The fuel is injected spatially into the immediate vicinity of the spark plug as well as at a suitable spacing in time ahead of the ignition time point. Then, with the aid of the spark plug, the fuel is ignited so that the piston 2 is driven in the next following work phase by the expansion of the ignited fuel.

In a so-called homogeneous operation of the engine 1, the throttle flap 9 is partially opened or closed in dependence upon the desired supplied air mass. The fuel is injected into the combustion chamber 4 by the injection valve 13 during an intake phase caused by the piston 2. The injected fuel is swirled by the simultaneously inducted air and thereby essentially uniformly distributed in the combustion chamber 4. Thereafter, the air/fuel mixture is compressed during the compression phase in order to then be ignited by the spark plug. The piston 2 is driven by the expansion of the ignited fuel.

A so-called double injection is provided as a further mode of operation of the engine 1. In this mode of operation, fuel is injected into the combustion chamber 4 of the engine 1 for a single combustion during the induction phase and during the compression phase.

The double injection can be used in a transition region to switch over from stratified operation to homogeneous operation and back. Likewise, it is, however, possible to operate the engine 1 in its total operating range with the described double injection. In this case, the respective advantages of the stratified operation and of the homogeneous operation can be achieved by correspondingly influencing the fuel injected during the intake phase and during the compression phase.

The fuel mass (which is injected by the injection valve 13 into the combustion chamber 4 during stratified operation, homogeneous operation and double injection) is closed-loop controlled and/or open-loop controlled by a control apparatus especially in view of a reduced fuel consumption and/or a reduced generation of toxic substances. For this purpose, the control apparatus is provided with a microprocessor which has a program stored in a memory medium and especially in a read-only-memory. The program is suited to carry out the above-mentioned open-loop control and/or closed-loop control.

Input signals are applied to the control apparatus and define operating variables of the engine 1 measured by means of sensors. For example, the control apparatus is connected to an air mass sensor, a lambda sensor and an rpm sensor. Furthermore, the control apparatus is connected to an accelerator pedal sensor which generates a signal giving the position of the accelerator pedal actuable by the driver. The control apparatus generates output signals with which, via actuators, the performance of the engine 1 can be influenced in correspondence to the desired open-loop control and/or closed-loop control. For example, the control apparatus is connected to the injection valve 13, the spark plug and the throttle flap 9 and generates the signals required for driving these elements.

The method for allocating the fuel mass to the intake phase and to the compression phase is carried out by the control apparatus. The method relates to the operating state of the double injection and is described in the following with respect to FIG. 2.

First, the control apparatus determines how much fuel must be supplied to the combustion chamber 4 in the next combustion in dependence upon the actual operating variables of the engine 1. This total fuel mass is identified by K in FIG. 2 and is symbolically illustrated.

In accordance with the above, the control apparatus then determines how much fuel of the total fuel mass K must be supplied to the combustion chamber 4 during the intake phase and during the compression phase for this next combustion. This breakdown is especially dependent upon the torque requested by the driver via the accelerator pedal. The greater the requested torque, the greater is the portion of fuel which must be supplied during the intake phase. If, in contrast, the engine 1 is at idle, then the fuel component, which is to be supplied during the intake phase, is relatively low or even zero and the required fuel is injected during the compression phase.

Figure 2:
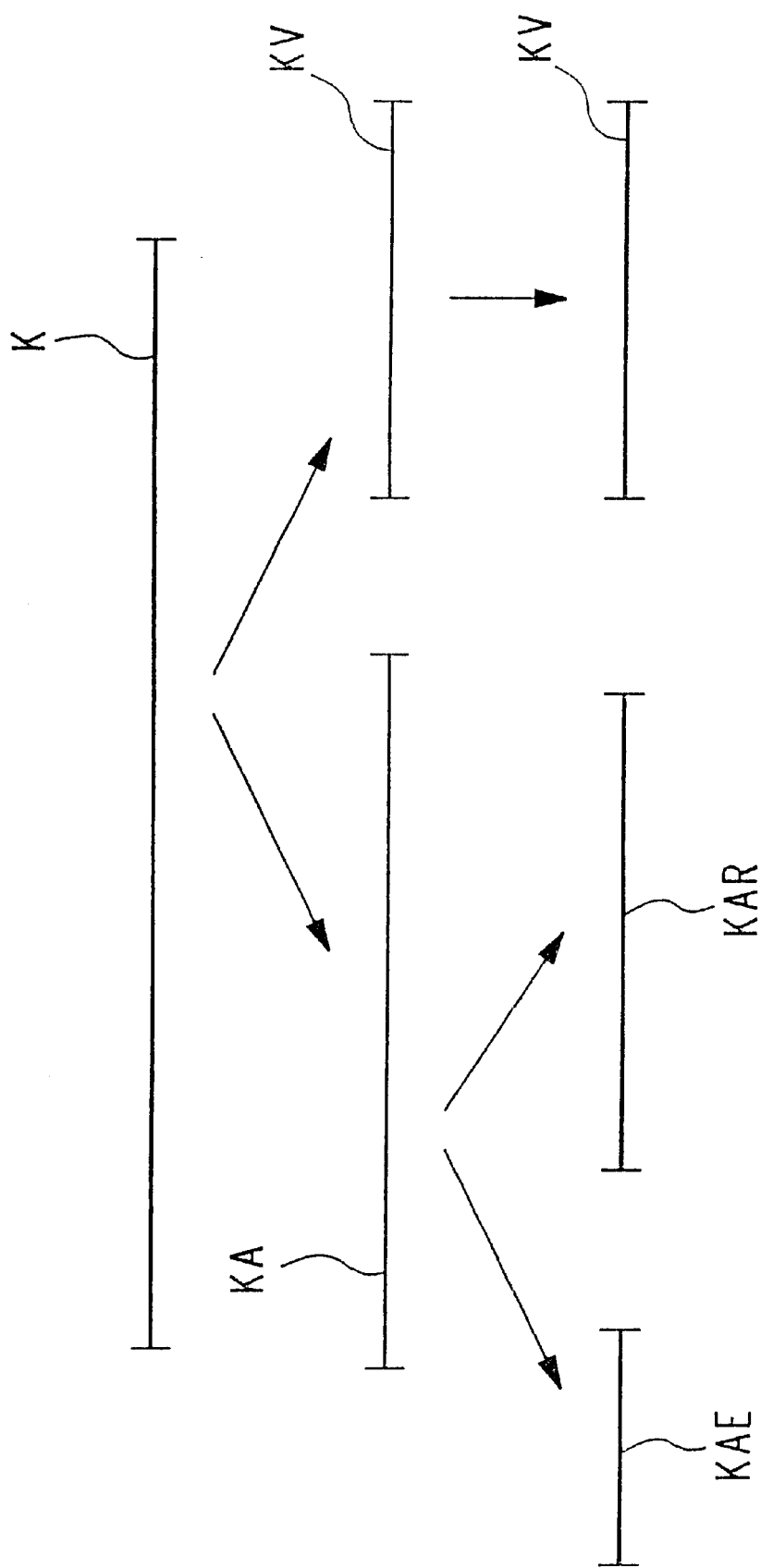

This breakdown is shown in FIG. 2 symbolically and by way of example by the fuel mass KA, which is supplied during the intake phase, and the fuel mass KV which is injected during the compression phase. The total fuel mass K supplied is therefore subdivided into a first part KA during the intake phase and into a second part KV during the compression phase.

The fuel mass KA, which is supplied during the intake phase, is put together by the control apparatus from two further parts, namely, from a third part KAE, which is injected via the injection valve 13, and a fourth part KAR comprised of regeneration gas. This too is shown symbolically and as an example in FIG. 2.

The fuel mass KV, which is injected during the compression phase, contains no component of regeneration gas and is completely injected via the injection valve 13.

The fuel mass KA is supplied to the combustion chamber 4 during the intake phase. The breakdown of the fuel mass KA into the injected fuel mass KAE and the fuel mass KAR, which is comprised of regeneration gas, is carried out in such a manner that as much fuel as possible is supplied via the regeneration gas. Accordingly, the tank-venting valve 11 is opened as wide as possible so that the third part KAR, which is made up of regeneration gas, becomes as large as possible and the part KAE, which is injected via the injection valve 13, becomes as small as possible or is a minimum value or is even zero.

In the operating state of the double injection, the fuel mass KA, which is to be supplied for the next combustion during the intake phase, is made up of the injected fuel mass KAE and the fuel mass KAR made up of regeneration gas. The fuel mass KV, which is to be supplied for the next combustion during the compression phase, is injected via the injection valve 13 and contains no component of regeneration gas. The total fuel mass K for the above-mentioned combustion is made up of the fuel mass KA, which is supplied during the intake phase, and the fuel mass KV, which is injected during the compression phase.

What is claimed is:

1. A method for operating an internal combustion engine including an engine of a motor vehicle, the engine having a combustion chamber and operating with an intake phase and a compression phase, the method comprising the steps of:

supplying a total fuel mass (K) to said combustion chamber during a single combustion;

supplying a first part (KA) of said total fuel mass (K) during said intake phase to said combustion chamber and injecting a second part (KV) of said total fuel mass (K) directly into said combustion chamber during said compression phase;

causing said first part (KA) of said fuel mass (K) to comprise a third part (KAE) which is injected directly into said combustion chamber and a fourth part (KAR) in the form of regeneration gas which is supplied to said combustion chamber only during said intake phase;

causing said second part (KV) of said total fuel mass (K) provided during said compression phase to be devoid of regeneration gas;

reducing said third part (KAE) and increasing said fourth part (KAR); and, supplying so much regeneration gas to the combustion chamber that said third injected part (KAE) reaches a minimum value or zero.

2. A control element including a read-only-memory for a control apparatus of an internal combustion engine including an internal combustion engine for a motor vehicle, the engine having a combustion chamber and operating with an intake phase and a compression phase, said control element comprising a program stored thereon which can be run on a computer apparatus including a microprocessor to carry out the method having the steps of:

supplying a total fuel mass (K) to said combustion chamber during a single combustion;

supplying a first part (KA) of said total fuel mass (K) during said intake phase to said combustion chamber and injecting a second part (KV) of said total fuel mass (K) directly into said combustion chamber during said compression phase;

causing said first part (KA) of said fuel mass (K) to comprise a third part (KAE) which is injected directly into said combustion chamber and a fourth part (KAR) in the form of regeneration gas which is supplied to said combustion chamber only during said intake phase;

causing said second part (KV) of said total fuel mass (K) provided during said compression phase to be devoid of regeneration gas;

reducing said third part (KAE) and increasing said fourth part (KAR); and, supplying so much regeneration gas to the combustion chamber that said third injected part (KAE) reaches a minimum value or zero.

* * * * *